United States Patent [19]

Tamada et al.

[11] Patent Number: 5,017,766

[45] Date of Patent: May 21, 1991

[54] PORTABLE ELECTRONIC APPARATUS CAPABLE OF CONFIRMING VALIDITY OF TRANSACTION DATA

[75] Inventors: Masuo Tamada, Yokohama; Tsutomu Tanaka, Tokyo; Hideo Matsuoka, Yokohama, all of Japan

[73] Assignee: Kabushiki Kaisha Toshiba, Kawasaki, Japan

[21] Appl. No.: 269,451

[22] Filed: Nov. 10, 1988

[30] Foreign Application Priority Data

Nov. 13, 1987 [JP] Japan ............................. 62-288120

[51] Int. Cl.$^5$ ............................................. G06F 15/21
[52] U.S. Cl. .................................... 235/492; 235/380; 902/2; 902/26
[58] Field of Search ............... 235/379, 380, 382.5, 235/492; 902/26, 4, 5, 1, 2; 340/825.31, 825.33, 825.34

[56] References Cited

U.S. PATENT DOCUMENTS

| | | | |
|---|---|---|---|
| 4,443,027 | 4/1984 | McNeely et al. | 235/494 |
| 4,650,975 | 3/1987 | Kitchener | 235/380 |
| 4,697,072 | 9/1987 | Kawana | 235/380 |
| 4,709,137 | 11/1987 | Yoshida | 235/379 |
| 4,746,788 | 5/1988 | Kawana | 235/380 |
| 4,766,293 | 8/1988 | Boston | 235/380 |
| 4,864,115 | 9/1989 | Imran et al. | 235/492 |

FOREIGN PATENT DOCUMENTS

| | | |
|---|---|---|
| 0174016 | 3/1986 | European Pat. Off. . |
| 0216375 | 4/1987 | European Pat. Off. . |
| 3222288 | 12/1983 | Fed. Rep. of Germany . |
| 2600444 | 6/1987 | France . |
| 86/03040 | 5/1986 | World Int. Prop. O. . |

Primary Examiner—Stuart S. Levy
Assistant Examiner—Robert Weinhardt
Attorney, Agent, or Firm—Cushman, Darby & Cushman

[57] ABSTRACT

In an IC card having an update function of transaction data, account type, supplementary amount, and valid date are input to the IC card. The IC card adds a renewal number data held therein to the input transaction data, and the data is encrypted using key data, thus generating reference confirmation data. Input confirmation data is generated using the identical encryption generation algorithm by a host system of a credit company. The input confirmation data is supplied to the IC card. A comparison means in the IC card compares the input confirmation data with the generated reference confirmation data. As a result of the comparison, if these data coincide each other, the input data is stored in the memory in the IC card as new transaction data and update processing is executed.

12 Claims, 3 Drawing Sheets

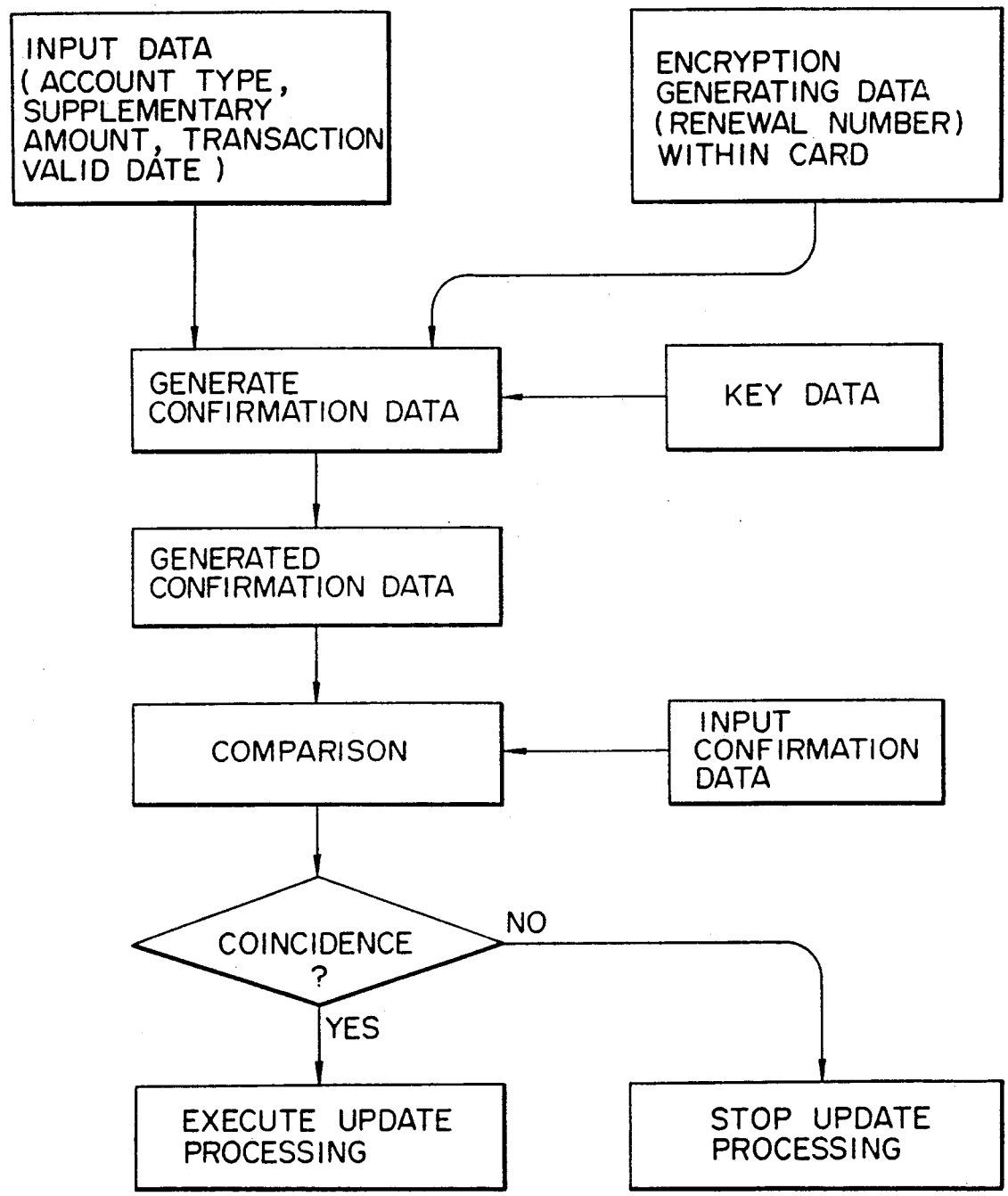
F I G. 3

PORTABLE ELECTRONIC APPARATUS CAPABLE OF CONFIRMING VALIDITY OF TRANSACTION DATA

BACKGROUND OF THE INVENTION

1. Field of the Invention

The present Invention relates to an IC card used, for example, as a credit card, a cash card, add the like.

2. Description of the Related Art

The conventional magnetic card, having a magnetic stripe for storing data, is in widespread use as a credit card or a cash card. Recently, however, an IC card incorporating a nonerasable nonvolatile memory controlled by a CPU built into an IC chip, has been receiving considerable attention as a replacement for the magnetic card, since the greatly increased memory capacity of the IC card over that of the magnetic card makes it possible for the IC card to be used in a much wider range of applications than is possible with a magnetic card. Recently, a multifunctional IC card has been developed which incorporates a battery therein, as well as a keyboard and a display section. This particular IC card, moreover, can be operated in an off-line manner; i.e. without having to be connected to a terminal device or the like.

When this IC card is used as a credit card or a cash card, a transaction valid date, representing a period for which transactions can be made, and a transaction limit amount, representing a maximum amount with which transactions can be made, are set and checked prior to the transactions. These transaction valid date data and transaction limit amount data are stored in a memory of the IC card, and can be externally updated, if desired.

In the conventional case, when the transaction valid date data and the transaction limit amount data are updated, there is no means by which the validity of externally input data can be authenticated. Therefore, the possibility exists that internally stored data may be updated, illegally, for fraudulent purposes. The transaction valid date data and the transaction limit amount data are particularly important data, and these data must not be illegally updated.

Note that the related art for generating a sales approval number on the basis of an input PIN and total amount is disclosed in U.S. Pat. No. 4,697,072 (Inventor: Shigeyuki Kawana, Title: "IDENTIFICATION CARD AND AUTHENTICATION SYSTEM THEREFOR").

SUMMARY OF THE INVENTION

It is an object of the present invention to provide a portable electronic apparatus which is capable of authenticating the validity of externally input data and, in particular, an apparatus which can prevent illegal updating of important data, and the like.

In order to achieve the above object, a portable electronic apparatus according to the present invention comprises: a memory for storing transaction data; a keyboard for inputting transaction data and confirmation data which is externally supplied; an encryption generating additional data generating section for generating encryption generating additional data; a reference confirmation data generating section for adding the encryption generating additional data to the transaction data which is input through the keyboard, the resultant data by means of predetermined key data, and generating reference confirmation data; a comparator for comparing the reference confirmation data with the input confirmation data, and outputting the comparison result; and a CPU for storing the transaction data which is input from the keyboard in the memory as new transaction data when a coincidence between these data is established as the comparison result.

According to the portable electronic apparatus of the present invention, the validity of all externally input transaction data can be authenticated, with update processing being executed. Only when the result of authentication is affirmative. In this way, important data stored in the memory is protected against illegal updating.

BRIEF DESCRIPTION OF THE DRAWINGS

Other objects and features of the present invention will be apparent from the following description taken in connection with the accompanied drawings, of which:

FIG. 3 is a flow chart for explaining update processing of the transaction limit amount and the transaction valid date in regard to the embodiment shown in FIGS. 1 and 2.

DETAILED DESCRIPTION OF THE PREFERRED EMBODIMENT

Figure 1:
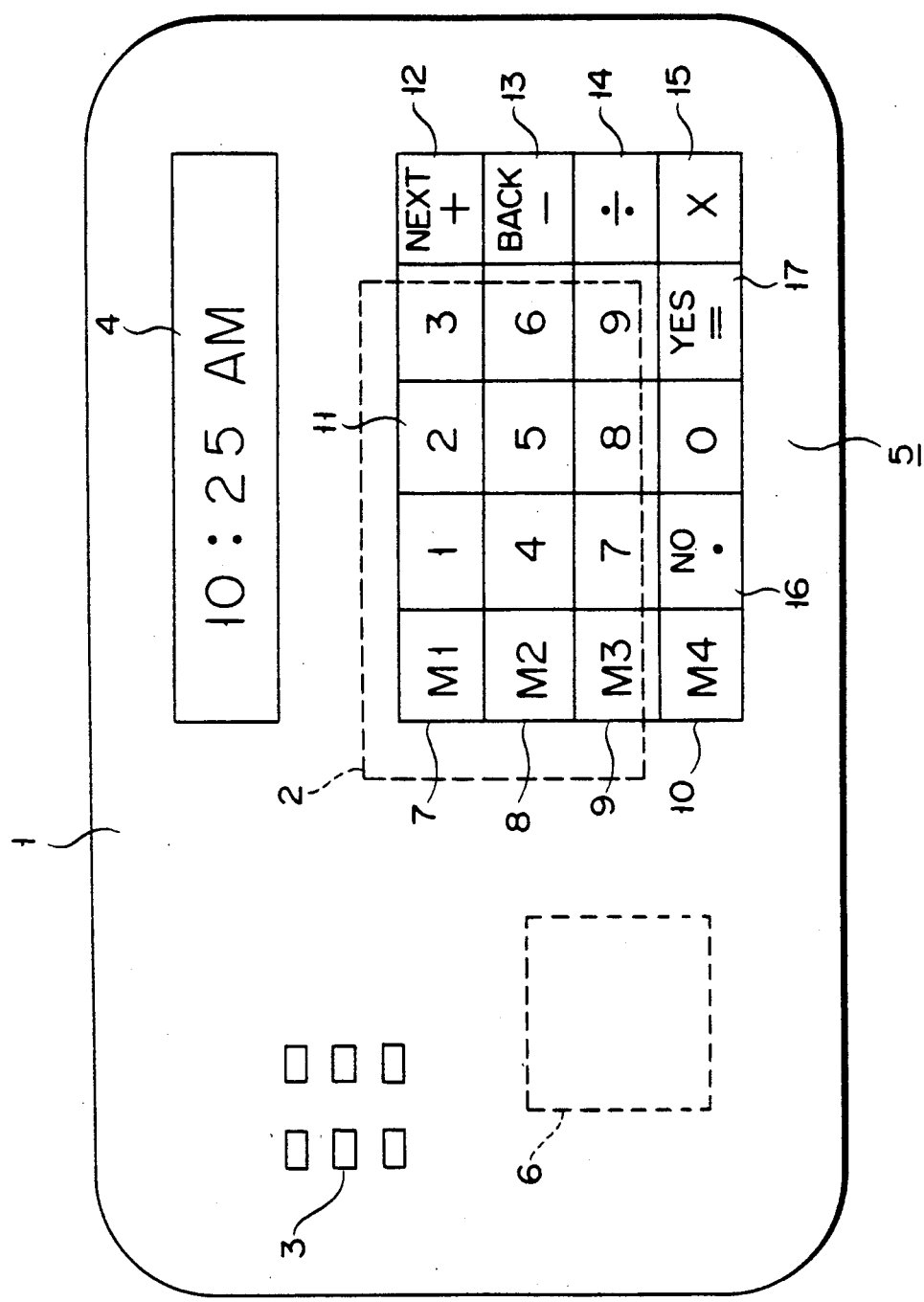
FIG. 1 is a view showing the outer appearance of a portable electronic apparatus according to an embodiment of the present invention.

FIG. 1 shows the outer appearance of a multifunctional IC card used, for instance, as a credit card, and being an example of a portable electronic apparatus according to the present invention. This IC card is designed such that it can be used both in on-line and off-line modes. For example, the IC card has a transaction function by means of which it can perform transactions in relation to a plurality of accounts (available as, e.g., a plurality of types of credit card and cash card), a time-piece function for displaying time-related data including the date and the time, a calculation function capable of executing at least four operations; and an electronic notebook function for storing and reading out addresses, names, phone numbers, and the like.

FIG. 1 shows card main body 1 which can be constituted by, for example, a thin plastic board of rectangular shape. Card main body 1 includes contact section 3, which is electrically connected to integrated circuit (IC) 2 buried in main body 1, for electrically communicating with a terminal device (not shown) in the on-line mode, liquid crystal display section 4 for displaying input/output data, time-related data, and the like, and keyboard 5, all of these units being arranged at predetermined positions on the front surface of main body 1. Card main body 1 additionally contains battery 6 for supplying a power source voltage.

Keyboard 5 includes account keys 7, 8, 9, and 10 for designating an account; numeric keys 11; addition key 12, subtraction key 13, division key 14, and multiplication key 15, these being the four-operation keys; decimal key 16; equal key 17; and the like.

Account key 7 designates a first operation (processing) for a first account (e.g., account data of a first credit company), account key 8 designates a second operation for a second account (e.g., account data of a second credit company), account key 9 designates a third operation for a third account (e.g., account data of a first bank), and account key 10 designates a fourth operation for a fourth account (e.g., account data for a second bank).

Addition key 12 is used as a "next" key for advancing the display state of liquid crystal display section 4, and for mode-selection; subtraction key 13 is used as a "back" key for restoring display section 4 to its previous display state; and equal key 17 serves a dual purpose, being the used as "yes" key and also as the initialization key (power-on key).

Embossed data (not shown) is formed at a predetermined position of the rear surface of card main body 1 as card holder data.

Figure 2:
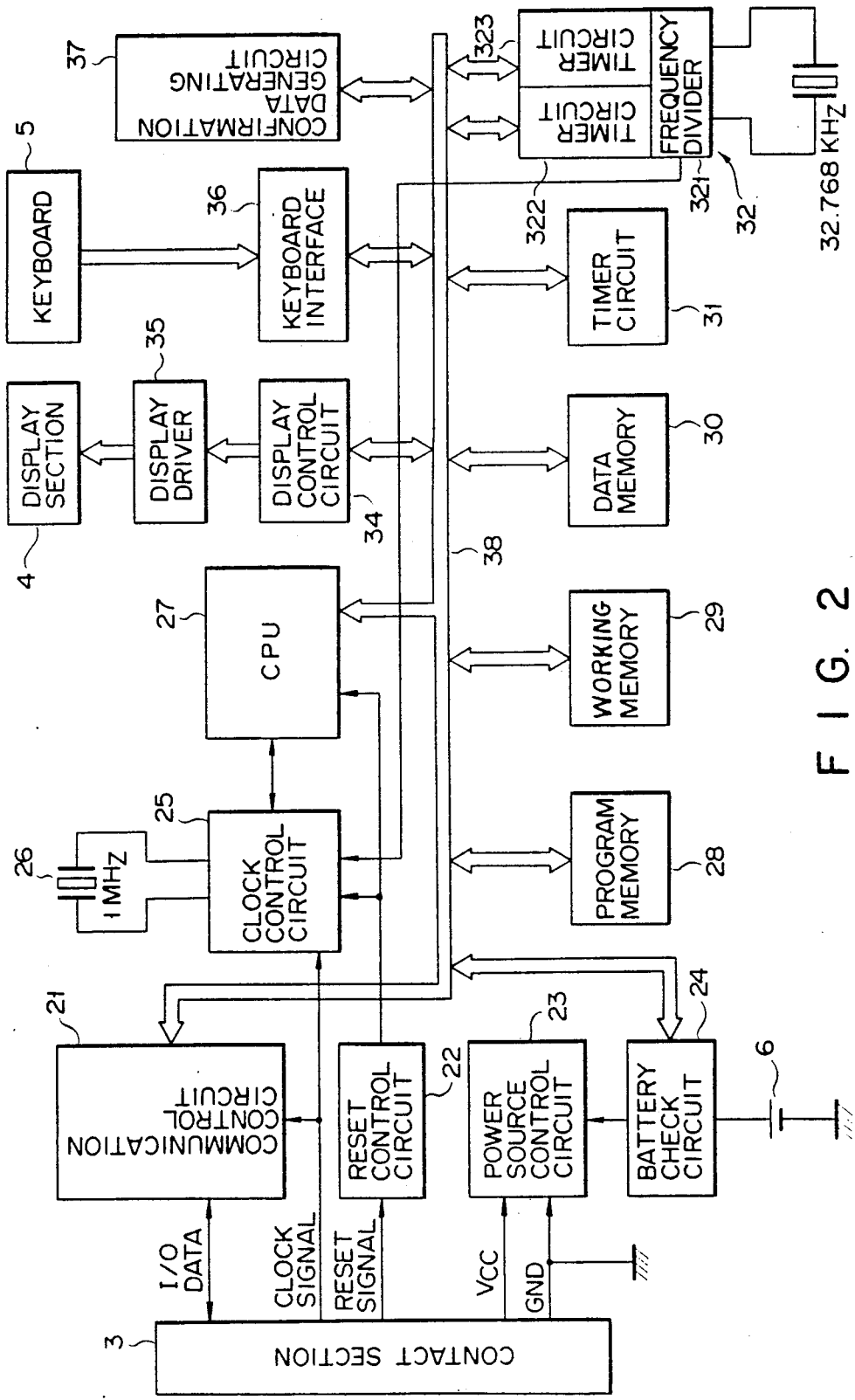
FIG. 2 is a block diagram showing a detailed arrangement of an integrated circuit shown in FIG. 1.

FIG. 2 shows a circuit arrangement of the integrated circuit shown in FIG. 1. Communication control circuit 21, reset control circuit 22, and power source control circuit 23 are connected to contact section 3. In addition, battery check circuit 24 for checking whether the voltage of battery 6 is more than a predetermined value or not is connected to power source control circuit 23. Internal bus 38 is connected to program memory 28 for storing a control program, working memory 29 used for arithmetic operations, data memory 30 consisting of a nonvolatile memory such as an EEPROM for storing transaction data, timer circuit 31 used when time is counted during program execution, and timer circuit section 32 for generating time-piece data including time data and date data. This timer circuit section 32 includes timer circuits 322 and 323, and frequency divider 311. Oscillator 33 having a frequency of 32.768 kHz is connected to timer circuit section 32.

Display section 4 is connected to internal bus 38 through display control circuit 34 and display driver 35. Keyboard 5 is also connected to internal bus 38 through keyboard interface 36. In addition, confirmation data generating circuit 37 for generating the confirmation data of the input transaction data using key data based on DES (Data Encryption Standard) and CPU (Central Processing Unit) 27 for controlling the entire circuit shown in FIG. 2 are connected to internal bus 38.

Communication control circuit 21 is operated in the on-line mode. More specifically, serial data supplied from the terminal equipment (not shown) through contact section 3 is converted into parallel data and output to data bus 38. Otherwise, parallel data supplied from data bus 38 is converted into serial data and output to the terminal equipment through contact section 3.

Reset control circuit 22 is operated in the on-line mode. This circuit 22 receives a reset signal supplied from the terminal equipment through contact section 3 to initialize CPU 27.

After the predetermined time is elapsed in the on-line mode, power source control circuit 23 is switched to be driven by a external power source (supplied from the terminal equipment through contact section 3) in place of battery 6. In the off-line mode, i.e., when the voltage of the external power source is decreased, power source circuit 23 is switched to be driven by battery 6 in place of the external power source. When key input is not performed (in a stand-by state) in the off-line mode, clock control circuit 25 stops the operation of oscillator 26 for generating a clock having a frequency of 1 MHz. In addition, the clock is not supplied to CPU 27, and the circuit is completely stopped. In this state, when initialization key 17 is turned on, oscillator 26 is operated. In addition, a time-piece clock of 32.768 kHz output from timer circuit section 32 is supplied to CPU 27. When the next key operation is performed after initialization key 17 is turned on, the clock of 1 MHz output from oscillator 26 is supplied to CPU 27. In the on-line mode, by supplying a reset signal from reset control circuit 22, the clock supplied from the terminal equipment through contact section 3 is input to CPU 27.

A transaction function program, a time-piece function program, a calculation function program, an electronic memorandum notebook function program, and the like are stored in program memory 28. CPU 27 selectively executes and processes these programs in program memory 28, so that the transaction function, the timepiece function, the calculation function, the electronic memorandum notebook function, and the like are selectively operated.

Account data (including transaction valid date data, transaction limit amount data, PIN, the renewal number of the transaction valid date and transaction limit amount) corresponding to the first through fourth accounts as described above are stored in data memory 30. When one of the above account keys 7 through 10 is pushed, the corresponding account data is selected and the corresponding processing is executed in accordance with the account data. In an electronic memorandum notebook area in data memory 30, addresses, names, and phone numbers are stored.

Timer circuit section 32 comprises frequency divider 321 which frequency-divides a clock of 32.768 kHz output from oscillator 33, and generates a one-second clock, and first and second timer circuits which generate time-piece data consisting of year-month-date data and time data by counting the clock generated from frequency divider 321. First timer circuit 322 is a display timer circuit which can freely set and change the time-piece data in accordance with the operation of keyboard 5 by card holder. Second timer circuit 323 is, e.g., a timer circuit in which time-piece data is set when the card is issued and which cannot change setting of the time-piece data unless the validity of the operation is proved by the predetermined procedures.

Display control circuit 34 converts display data supplied from CPU 27 into a character pattern using a character generator (not shown) comprising an internal ROM, and displays the converted character pattern on liquid crystal display section 4 through display driver 35.

Confirmation data generating circuit 37 generates reference confirmation data for confirming the validity of input data. For example, as shown in FIG. 3, confirmation data generating circuit 37 generates confirmation data encrypted using the predetermined key data on the basis of the input data such as an account type, a supplementary amount of the transaction limit amount, and the transaction valid date (year, month, and day), and encryption generating data (inherent data) within the card such as a renewal number of the transaction limit amount and the transaction valid date stored in data memory 30.

With this arrangement, the case where an IC card holder purchases a desired item using this IC card, e.g., in the off-line mode will be described hereinafter. At first, the card holder presents the IC card to a store clerk of a retail store. The store clerk receives the IC card, and imprints embossed data on the IC card in an emboss imprint section of a transaction slip by an emboss imprinter. Then, the store clerk returns the IC card to the card holder, and writes transaction data such as a transaction amount and transaction date in the corresponding space of the transaction slip.

The card holder selects an account type by account keys 7 through 10 of keyboard 5. CPU 27 reads out account data corresponding to the selected account type from data memory 30. CPU 27 displays the account type on liquid crystal display section 4, and also displays a message for urging the card holder to input a PIN. Then, the card holder inputs the PIN by ten keys 11 of keyboard 5. Therefore, CPU 27 compares and verifies the input PIN with the PIN in the account data which is read out from data memory 30, and the validity of the card holder is judged. As the result of the judgement, if the card holder is invalid, the message representing this fact is displayed on liquid crystal display section 4, and the transaction is ended. However, if the card holder is valid, CPU 27 displays the message "Shopping?". When the card holder pushes "yes" key 17 of keyboard 5, CPU 27 sets a "shopping" mode. In addition, CPU 27 compares and verifies transaction valid date data in the account data read out from data memory 30 with date data generated from second timer circuit 323 to judge the valid date. As a result of the judgement, if the transaction date is not within the valid period of the IC card, the message representing that the valid date is exceeded is displayed on liquid crystal display section 4, and this transaction is ended. As a result of the judgement, if the transaction data is within the valid period, CPU 27 displays the message for urging the card holder to input the transaction amount.

When the card holder, therefore, inputs the transaction amount by ten keys 11 of keyboard 5, CPU 27 compares and verifies the input transaction amount with the transaction limit amount data in the account data read out from data memory 30 and judges whether the transaction is possible or impossible. As a result of the judgement, if the transaction is impossible, the message representing that the transaction is impossible is displayed on liquid crystal display section, and this transaction is ended. On the contrary, if the transaction is possible, CPU 27 substracts the input transaction amount from the transaction limit amount data in the account data read out from data memory 30, and updates the transaction limit amount data in data memory 30 using the subtracted result as new transaction limit amount data.

Then, the card holder presents the IC card to the store clerk. The store clerk receives the IC card, writes the displayed account type into the corresponding space of the transaction slip, and passes the transaction slip to the card holder. The card holder writes his or her name into the space for a signature of the transaction slip, and returns the transaction slip to the store clerk. Then, the shopping procedures are completed.

Update processing of the transaction limit amount and the transaction valid date of the designated account type as an example of the validity of the input data will be described below with reference to FIG. 3.

The card holder selects the account type by account keys 7 through 10 of keyboard 5. Then, CPU 27 reads out the account data corresponding to the selected account type from data memory 30, displays the account data on liquid crystal display section 4, and displays the message for urging the card holder to input the PIN. When the card holder inputs the PIN by numeric keys 11 of keyboard 5, CPU 27 compares and verifies the input PIN with the PIN in the account data read out from data memory 30 and judges the validity of the card holder. As a result of the judgement, if the card holder is invalid, the message representing the invalidity of the card holder is displayed on liquid crystal display section 4, and the operation is ended. As the result of the above judgement, if the card holder is valid, CPU 27 displays the message "Shopping?" on liquid crystal display section 4. At this time, the card holder repeatedly pushes "next" key 12 of keyboard 5 to select a mode. When the message "Update?" is displayed on liquid crystal display section 4, pushing of "next" key 12 is stopped. When the card holder pushes "yes" key 17 of keyboard 5, CPU 27 sets the update mode, and displays the message for urging the card holder to input the amount on liquid crystal display section 4.

When the card holder, therefore, inputs the supplementary amount of the transaction limit amount to be updated by numeric keys 11 of keyboard 5, CPU 27 displays the message for urging the card holder to input the data on liquid crystal display section 4. The card holder inputs the confirmation data by keyboard 5. The confirmation data input from keyboard 5 is generated as follows. The card holder calls, e.g., a credit company and informs the account type, and the transaction amount and the transaction valid date which are to be updated to the company. As a result, the credit company encrypts a data string of the account type, the transaction amount and transaction valid date to be updated, and the renewal number with key data based on DES, using a host system and the same algorithm as confirmation data generating circuit 37. Then, the confirmation data is generated. The generated confirmation data is informed to the card holder by a phone call. The card holder inputs the confirmation data from keyboard 5.

When the input of the confirmation data is completed as described above, the card holder inputs the account type, and the transaction amount and transaction valid date (year, month, and day) which are to be updated as the transaction data to be updated. CPU 27 receives these input data and supplies a renewal number (sequence number) in the account data readout from data memory 30 to confirmation data generating circuit 37. Note that the renewal number is updated upon every updating of the transaction limit amount and transaction valid date. Confirmation data generating circuit 37 encrypts the data string of the supplied account type, transaction amount and transaction valid date which are to be updated, and renewal number (stored in the predetermined region of the data memory) using the key data in accordance with DES to generate reference confirmation data. CPU 27 compares the input confirmation data with the reference data. When these data coincide with each other, CPU 27 judges that input data and]the input confirmation data are valid, and updates the transaction limit amount data and the transaction valid date data in the selected account data on the basis of the input data. On the other hand, when the above data do not coincide with each other, CPU 27 judges that at least one of the input data and the input personal data is invalid, and stops the update processing.

When the transaction limit amount and the transaction valid date are updated as described above, by inputting the data for updating (account type, supplementary amount, date) from the keyboard, the confirmation data encrypted using the predetermined key data is generated on the basis of the input data and the encryption generating data within the card such as renewal number stored in the data memory. Then, the generated confirmation data is verified with the confirmation data which is input from the keyboard, and the validity of the above input data is judged. Therefore, the validity of the input data from the keyboard can be judged. When the result of the judgement is negative, the update processing is stopped. Only when the result of the judgement is affirmative, the update processing is executed and the illegal updating of the transaction limit amount data and transaction valid date data which are stored in data memory 30 can be prevented.

When the renewal number (sequence number) is used as the encryption generating data within the card, it can be controlled so that the encryption generating data which was once used cannot be used again. More specifically, the latest renewal number is input with the confirmation data at the next renewal. By comparing the input renewal number with the renewal number in the data memory, when the same or smaller renewal number is input, the update processing can be prohibited.

Note that, although the above-described embodiment is described with reference to the off-line mode, the operation in the on-line mode is similar to that in the off-line mode. In this case, the data for updating (account type, supplementary amount, and date) and the confirmation data are input from the keyboard of the terminal equipment in which the IC card is set due to the on-line operation. Then, the data are input to CPU 27 through contact section 3 and communication control circuit 21 of the IC card.

In the above embodiment, the transaction limit amount and the transaction valid date are simultaneously updated. However, these data need not be updated simultaneously and may be updated separately. In addition, the updating data is not limited to the transaction limit amount and the transaction valid date, and other data can be updated or changed.

In the above embodiment, although the renewal number is used as the encryption generating data within the card, the data is not limited to the renewal number. For example, time-piece data generated from second timer circuit 323, or transaction number (updated upon every transaction and upon updating stored in data memory 30) may be used.

What is claimed is:

1. A portable electronic apparatus comprising:
   data storing means for storing transaction data;
   input means for inputting transaction data to be stored in said data storing means and confirmation data for confirming the validity of the transaction data;
   additional data generating means for sequentially generating additional data, each additional data generated in a particular transaction being different from additional data which has been generated in an immediately previous transaction;
   means for generating internal confirmation data from data which includes the additional data from said additional data generating means and the transaction data input from said input means;
   comparing means for comparing the internal confirmation data generated by said internal confirmation data generating means with the confirmation data input from said input means, and outputting a comparing result; and
   control means for storing the transaction data input from said input means into said data storing means when the comparison result from said comparing means indicates a coincidence.

2. An apparatus according to claim 1, wherein the additional data includes a renewal number of the transaction data.

3. An apparatus according to claim 1, wherein said internal confirmation data generating means generates the internal confirmation data by encrypting a combination of the additional data and the transaction data, using a binary value on the basis of Data Encryption Standard.

4. An apparatus according to claim 1, wherein the transaction data includes credit limit data, and expiration valid date data.

5. An apparatus according to claim 4, wherein said control means includes an update means for updating at least one of the credit limit data and the expiration date data, said additional data generating means includes means for changing a renewal number which is changed upon every execution of the update processing, and said internal confirmation data generating means generates changed internal confirmation data each time the update processing is to be performed.

6. An apparatus according to claim 1, wherein said apparatus is operatively connected to a host system, the confirmation data being generated by said host system.

7. An apparatus according to claim 6, wherein said internal confirmation data generating means includes a same data generating means as means for generating the confirmation data, provided in said host system.

8. An apparatus according to claim 5, wherein said additional data generating means includes means for protecting the renewal number from being updated by an external access.

9. An apparatus according to claim 4, wherein said control means includes means for updating at least one of a transaction amount data and a transaction valid date data, said additional data generating mans is a timer for generating date data, and said internal confirmation data generating means generates different reference confirmation data using the date data from said timer upon every update processing.

10. An apparatus according to claim 4, wherein said control means includes means for updating at least one of a transaction amount data and a transaction valid date data, said additional data generating means is a counter for counting a transaction number, and said internal confirmation data generating means generates different confirmation data using the transaction number from said counter upon every update processing.

11. An apparatus according to claim 1, wherein said apparatus is an IC card.

12. A portable electronic apparatus comprising:
   memory means for storing data including inherent data to be used for generating confirmation data;
   input means for inputting data including confirmation data;
   control means for controlling said memory means and said input means;
   confirmation data generating means for generating confirmation data encrypted using predetermined key data on the basis of input data from said input means and the inherent data; and
   authentication means for verifying the confirmation data, generated by said confirmation data generating means, with the confirmation data input from said input means, to authenticate the validity of the input data whereby said control means stores the input data in said memory means if the validity of the input data is authenticated.

* * * * *